United States Patent [19]

Hensel et al.

[11] 4,143,905
[45] Mar. 13, 1979

[54] MOTOR-VEHICLE SEAT HINGE

[75] Inventors: Wolfgang Hensel, Langenfeld; Paul Werner, Remscheid, both of Fed. Rep. of Germany

[73] Assignee: Keiper Automobiltechnik GmbH & Co KG, Remscheid-Hasten, Fed. Rep. of Germany

[21] Appl. No.: 833,337

[22] Filed: Sep. 14, 1977

[30] Foreign Application Priority Data

Sep. 16, 1976 [DE] Fed. Rep. of Germany ....... 2641582

[51] Int. Cl.² .............................................. B60N 1/00
[52] U.S. Cl. .................... 296/65 R; 280/650; 297/366
[58] Field of Search ................ 296/66, 69, 63, 65 R; 280/650; 297/366

[56] References Cited

U.S. PATENT DOCUMENTS

| 3,165,351 | 1/1965 | Clancy et al. | 296/65 R |
| 3,973,799 | 8/1976 | Berg | 296/65 R |
| 4,015,877 | 4/1977 | Gladstone | 296/65 R |

Primary Examiner—Richard A. Bertsch
Attorney, Agent, or Firm—Michael J. Striker

[57] ABSTRACT

A motor-vehicle seat has a seat part and a back part interconnected by means of a hinge having a first hinge element secured to one of these parts and a second hinge element secured to the other part and pivotal on the first element about a horizontal axis. One of these elements is formed as a ring gear with an annular array of inwardly directed teeth and the other element carries a plurality of individually pivoted pawls which can be swung radially outwardly into mesh with these teeth to lock the two elements relative to each other. A cam is provided for radially pivoting these pawls to lock the seat back in any position relative to the seat part. Each pawl has a pivot pin secured in the respective hinge element which is also provided with a plurality of formations adjacent the front ends of these pawls so that even if the pivot pins of the pawls break off the pawls will be supported inside the hinge and the two hinge elements will not be able to pivot relative to each other.

14 Claims, 6 Drawing Figures

MOTOR-VEHICLE SEAT HINGE

BACKGROUND OF THE INVENTION

The present invention relates to a hinge. More particularly this invention concerns a hinge for interconnecting the seat part and the back part of a motor-vehicle seat.

The back part of the front seat of a motor vehicle can normally be pivoted about an axis transverse to the normal direction of travel of the vehicle so that the seat can be adjusted for the comfort of the passenger. For such adjustment it is necessary not only that a plurality of different positions be assumable by the back part relative to the seat part, but also that the back part be held very rigidly and solidly in place once its proper position has been selected. Forward pivoting of the back part of the seat during a collision or rapid stop must be prevented in order to avoid injury to a front-seat passenger.

A typical such mechanism is a hinge having a pair of hinge elements, one of which is secured to the back part of the seat and the other of which is secured to the seat part. One of these elements is formed with an annular array of inwardly directed teeth. The other element of the hinge carries one or more pawls having outwardly directed teeth and pivotal so that the teeth on the pawls can be brought into engagement with the teeth on the other element. Means, normally in the form of a cam operated by a radially extending handle, is provided for pivoting these pawls.

Thus with such an arrangement the seat position is adjusted by actuating the handle so as to pull the teeth of the pawls out of mesh with the teeth of the other hinge element. The seat is then moved to the proper position and the handle is returned to its original position to lock the hinge elements angularly relative to each other.

Each of these pawls is normally pivoted in that hinge element which does not have the annular array of teeth by means of a pin formed directly on the pawl and journalled in the respective hinge element. Such construction allows the hinge to be produced at approachable cost, yet offers a relatively long service life. The principal disadvantage of this system is that in case of an accident or the like wherein the seat back is stressed very forcefully forwardly it is possible for these pivot pins on the pawls to break off. Once broken off the pawls can then move freely and the seat back can correspondingly pivot forwardly. Thus a common occurrence in the known hinges is that they fail to hold the seat back relative to the seat part at that time when such securing is most important.

SUMMARY OF THE INVENTION

It is therefore an object of the present invention to provide an improved hinge for a motor-vehicle seat.

Another object of this invention is to provide such a hinge which holds the seat back firmly relative to the seat part even if the pivot pins on the pawls break off.

These objects are attained according to the present invention in a hinge of the above-described general type wherein a formation is fixed angularly on that hinge element on which the pawls are pivoted. This formation has a rear surface closely angularly juxtaposed with the respective front face of the respective pawl to such a side thereof that forward pivoting of the seat back with the pawl and hinge teeth meshed urges the rear surface and front face toward one another. Thus, even if the pawl pins break off the pawls will be supported by these front or forward surfaces and the seat back will be securely held relative to the seat part of the motor-vehicle seat.

According to further features of this invention each of these formations is integrally formed with the hinge element on which the pawls are journalled, and each has a rear surface as described above, and a rear surface. The rear surface is correspondingly closely juxtaposed with the forward face of the trailing pawl. The terms "trailing, forward, rear," and the like refer to the displacement direction of the hinge teeth relative to the pawls when the seat back is pivoted forwardly in the direction of travel of the motor vehicle.

In accordance with yet another feature of this invention the faces of the pawls and corresponding surfaces of the formations on the hinge element carrying the pawls are complementary. These surfaces are circularly or cylindrically arcuate. The front faces of the pawls have centers of cutvature lying at the respective pawl axes.

The provision of surfaces on these formations juxtaposed with both end faces of the pawls insures that if the pivot pins of the pawls break off, no matter what the direction of the force exerted on the seat back, a surface is provided to support these pawls. Thus even if the vehicle having such a seat is struck sharply from behind so as to break off the pivot pins, the seat back cannot easily pivot backwardly.

Accordingly to further features of this invention the cam means includes an inner cam engageable with the radially inwardly directed faces of the pawls. Rotation of this cam presses the pawls radially outwardly. Another cam or control disc angularly coupled to this inner cam engages axially extending pins formed on each of the pawls at the ends thereof remote from the ends having the pivot pins. This control disc or cam has surfaces which are engageable with these pins to urge them inwardly when the cam means is rotated in such a direction as to pull the inner cam away from the inner faces of the pawls. Thus rotation of the cam means by means of a handle in one direction will positively pull the pawls inwardly out of contact with the ring of teeth.

It is of course within the scope of this invention to provide only a single such pawl. Provision of a plurality of pawls is advantageous in that it distributes the forces evenly and ensures that the construction is extremely strong. For each pawl it is necessary to provide at least one formation.

The novel features which are considered as characteristic for the invention are set forth in particular in the appended claims. The invention itself, however, both as to its construction and its method of operation, together with additional objects and advantages thereof will be best understood from the following description of specific embodiment when read in connection with the accompanying drawings.

SPECIFIC DESCRIPTION OF A PREFERRED EMBODIMENT

Figure 1:
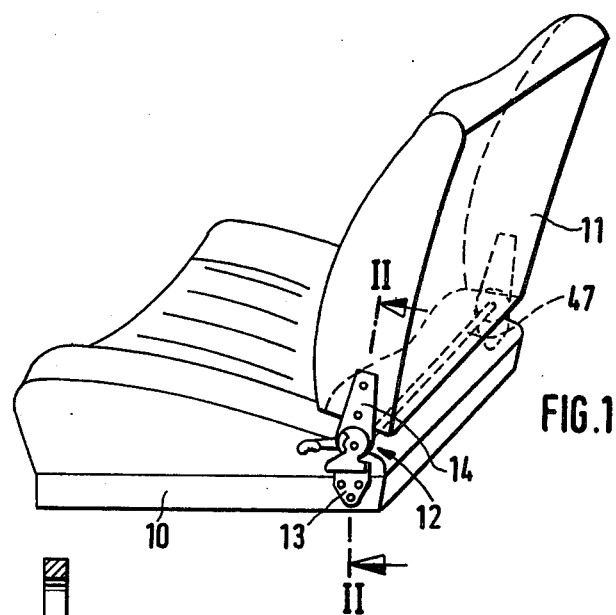
FIG. 1 is a perspective view of a motor-vehicle seat according to this invention.
Figure 2:
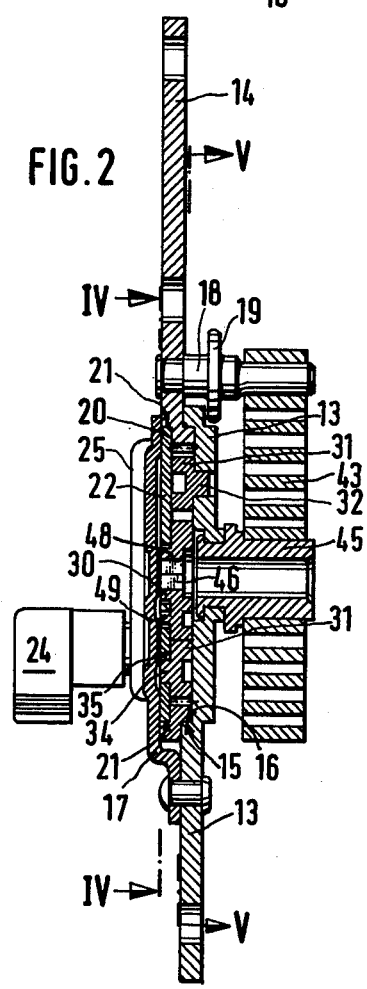
FIG. 2 is a section taken along line II—II of FIG. 1.

As shown in FIG. 1, a motor-vehicle seat has a seat part 10 on which is mounted a back part II by means of hinges 12 for pivoting about an axis A (FIG. 2). A pair of such hinges 12 of like construction are provided and each has a lower hinge element or plate 13 bolted to the seat part 10 and an upper hinge element or plate 14 bolted to the seat back 11. The vehicle normally moves in a direction of travel T.

As better shown in FIGS. 2-6 the lower or fixed hinge element 13 is formed with a circular recess 15 in which is received a circular disc-like projection 16 of the upper or movable part 14. These formations 15 and 16 are centered on the axis A. A plate 17 bolted to the fixed element 13 secures the element 14 tightly in place on the element 13, and a bolt 18 having a rim 19 further prevents relative axial movement of the two elements 13 and 14.

The element 14 is formed concentric with its projection 16 with a cylindrically annular array of inwardly directed teeth 20 constituting a ring gear. This element 14 is further formed with a circular recess 21 on its one axial face directly axially aligned with its projection 16 and rotatably receiving a control disc or plate 22 constituting an outer arm and formed integrally with a forwardly projecting lever arm 23 having at its forward end a handle 24. The handle 23 extends through a cutout 25 in the plate 17 and is normally biased for rotation in what will hereafter be referred as the forward rotational sense F by means of a spring 27 connected between the handle 23 and an abutment 26. The handle 24 can be moved from the normal forward solid-line position of FIG. 3 manually backwardly in the backward rotational sense B into the dot-dashed line position of FIG. 3 for adjustment of the angular position of the seat back 11 relative to the seat part 10.

Three identical cams 31 are provided inside the ring gear formed by the teeth 20 and each has a row of teeth 33 meshable with the teeth 20. In addition each pawl 31 has adjacent its front end face 38 and on axial side an axially projecting pivot pin 32 and adjacent its rear end face 39 and on its opposite axial face another axially projecting pin 34. The pins 32 are journalled in respective axially throughgoing bores 51 formed in the lower or fixed hinge element 13. Thus each pawl 32 can pivot about a respective pawl axis 32A parallel to the pivot axis A of the assembly.

The control disc 22 is formed at the axis A with a throughgoing cylindrical hole 28 through which engages an axial extension 48 of an inner cam disc 30. Furthermore the control disc 22 is formed radially offset from the axis A with three angularly equispaced throughgoing holes 29 in each of which engages a respective axial projection 49 of the inner cam 30. The formations 48 and 49 are loosely received in the corresponding holes 28 and 29 so that the inner cam 30 can shift limitedly relative to the outer control disc or cam 22. This cam 30 has three lobes 37 each engageable with a respective radially inner surface 50 of a respective one of the pawls 31.

The control disc 22 is also formed with three arcuate slots 35 through each of which extends a respective one of the pins 34 of the pawls 31. The front ends of these slots are not centered on the axis A but are inclined inwardly thereto so that backward pivoting of the control disc 22 will bring these inclined surfaces 36 into engagement with the pins 34 and urge the rear ends 39 of the pawls 31 inwardly.

Figure 3:
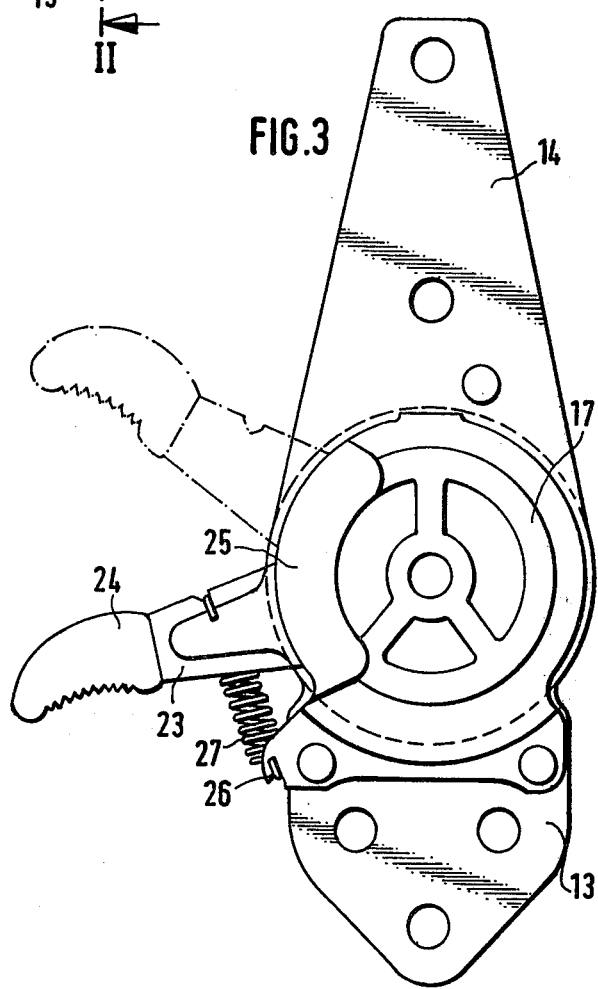
FIG. 3 is a side view of the structure shown in FIG. 2.
Figure 4:
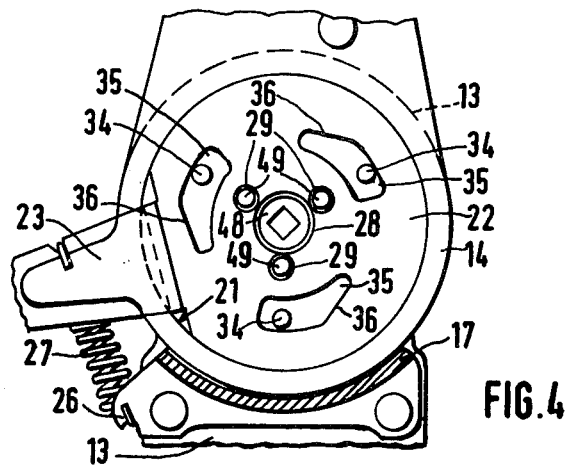
FIGS. 4 and 5 are sections taken along lines IV—IV and V—V of FIG. 2.
Figure 5:
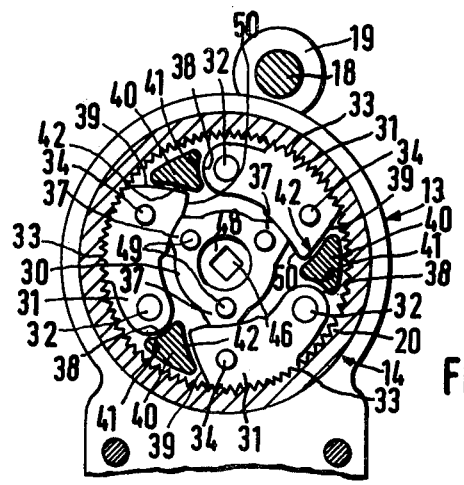
Figure 6:
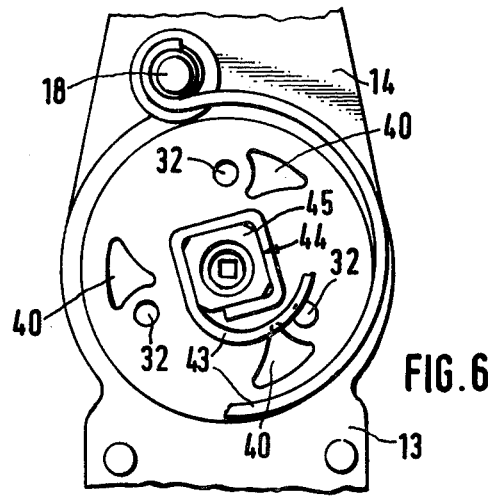
FIG. 6 is a side view taken in the opposite axial direction from the view of FIG. 3 with some parts shown schematically and some parts removed for clarity of view.

Thus when the handle 24 is in the solidline normal position of FIG. 3 the cam lobes 37 will be pressing the teeth 33 tightly into mesh with the teeth 20 so as pivotally to lock the elements 13 and 14 relative to each other. At the same time the pins 34 will lie in the rear ends of the arcuate slots 35. Pivoting of the handle 24 upwardly to the actuated position shown in dot-dashed lines in FIG. 3 will move the lobes 37 out of engagement with the inclined inner surfaces 50 of the pawls 31 and will bring the inclined surfaces 36 of the slots 35 into engagement with the pins 34. This action will pivot the rear ends of the pawls 31 inwardly so that the teeth 33 will be brought out of mesh with the teeth 20. In this position the elements 14 and 13 can rotate relative to each other.

To assist adjustment of the seat in the position wherein the teeth 34 and 20 are out of mesh with each other a spring 43 is provided whose outer end is secured to the bolt 19 and whose inner end is secured to a square portion 44 of a pivot tube 45 centered on the axis A and fixed to the element 13. The spring 43 is biased in such a direction that it normally urges the upper element 14 forwardly in rotational sense F so as to pivot the seat back 11 forwardly in the travel direction T.

Formed integrally on the lower hinge plate 13 are three generally triangular formations or projections 40 each having a rear surface 41 juxtaposed with a respective one of the front faces 38 and a front surface 42 juxtaposed with the rear face 39 of the leading pawl 31. Each face 38 has a center of curvature at the respective axis 32A and the corresponding rear surface 41 is similarly circularly arcuate with the same radius of curvature. The surface 42 is similarly complementary to the face 39, but these two surfaces are flatter. The surfaces 42 extend forwardly at an angle to respective radii drawn to the axis A.

In case of an accident forcing the seat part 11 forwardly with sufficient force to break off the pins 32 the front end faces 38 of the pawls 31 will come into flush engagement with the surfaces 41 so that further displacement of the pawls 31 angularly about the axis A is impossible. Thus even if the pins 32 are broken off the hinge elements 13 and 14 will be fixed relative to each other.

Similar stressing in the opposite or backward direction will bring the surfaces 39 and 42 similarly into engagement with each other so as similarly to prevent further displacement of the hinge elements 13 and 14 relative to each other.

Although it is possible to use two hinges 12 for each seat which are only different in that one is mirror-symmetrical to the other, it is advantageous to provide only one of the control plates 22 with a handle 23. To this end the cams 30 are formed with square-section holes 36 at the axis A and a connecting rod 47 extends along this axis A between the two hinges 12. Thus operation of the one hinge will automatically operate the other hinge.

It is noted that it is within the scope of this invention to provide the annular ring of teeth 20 on the element 13 and the pawls 31 on the element 14 if desired. Similarly, other means may be provided to pivot the two elements 13 and 14 together and various kinematic reversals of the structure are intended to lie within the scope of this invention.

It will be understood that each of the elements described above and two or more together may also find a useful application in other types of mechanism differing from the types described above.

While the invention has been illustrated and described as embodied in a motor-vehicle seat hinge, it is not intended to be limited to the details shown, since various modifications and structural changes may be made without departing in any way from the spirit of the present invention.

Without further analysis the foregoing will so fully reveal the gist of the present invention that others can, by applying current knowledge, readily adapt it for various applications without omitting features that, from the standpoint of prior art fairly constitute essential characteristics of the generic or specific aspects of this invention.

What is claimed as new and desired to be protected by Letters Patent is set forth in the appended claims:

1. In a motor-vehicle seat having a back part and a seat part and adapted to move normally in a predetermined direction of travel, a hinge comprising:
   a first hinge element mounted on one of said parts;
   a second hinge element mounted on the other of said parts and pivotal on said first hinge element about a pivot axis extending transverse to said direction of travel for forward pivoting of said back part in said direction of travel and backward pivoting of said back part against said direction of travel, said second hinge element being provided with an annular array of inwardly directed hinge teeth centered on said pivot axis;
   a plurality of pawls spaced angularly about said pivot axis and each having an end provided with a generally axially extending pin defining a respective pawl axis and journalled in said first hinge element, each pawl being formed with outwardly directed pawl teeth meshable with said hinge teeth and with a front face directed angularly forwardly relative to said pivot axis;
   cam means connected to said pawls for pivoting same about the respective pawl axes and thereby bringing said pawl teeth into and out of engagement with said hinge teeth for fixing and freeing said hinge elements relative to each other pivotally about said pivot axis; and
   a formation adjacent each of said front faces and angularly fixed on said first hinge element, each of said formations having a rear surface closely angularly juxtaposed with the respective front face to such a side thereof that forward pivoting of said seat back with said teeth meshed urges each front face and the respective rear surface toward each other.

2. The seat defined in claim 1 wherein said second hinge element is pivotal forwardly in one rotational sense about said pivot axis on said first hinge element and backwardly thereon in the opposite rotational sense, said front face of the respective pawl trailing said rear surface in the forward rotational sense.

3. The seat defined in claim 2 wherein said first hinge element is fixed to the seat part of a motor-vehicle seat and said second hinge element is fixed to the back part of said seat, said forward sense of pivoting of said second element corresponding to displacement of said seat back forwardly in the direction of travel of the vehicle having said seat.

4. The seat defined in claim 3 wherein said rear surface is spaced forwardly from said front face.

5. The seat defined in claim 3 wherein said front face is engageable with and complementary to said rear surface.

6. The seat defined in claim 3 wherein each said pawl has another end behind in said forward sense said front face, said hinge further comprising another such formation having a front surface engageable with said other end.

7. The seat defined in claim 3 each formation having relative to said one rotational sense one such rear surface and a forward surface and each pawl having another end having a rear face juxtaposed with a respective front surface.

8. The seat defined in claim 7 wherein each face is complementarily shaped to the respective surface.

9. The seat defined in claim 8 wherein said front faces are circularly arcuate.

10. The seat defined in claim 8 wherein each of said rear surfaces and the corresponding front faces are circularly arcuate and said front faces have respective centers of curvature at the respective pawl axes.

11. The seat defined in claim 3 wherein each said pawl has another end trailing said one end in said forward sense and provided with a generally axially projecting pin engaging said cam means.

12. The seat defined in claim 3 wherein three such pawls and three such formations are provided.

13. The seat defined in claim 3, further comprising spring means operatively connected to each said pawl and urging said pawl teeth into mesh with said hinge teeth.

14. The seat defined in claim 1 wherein each said pawl has an inner face directed radially inwardly toward said pawl axis and engageable with said cam means.

* * * * *